United States Patent
Yamagata et al.

(10) Patent No.: US 9,563,025 B2
(45) Date of Patent: Feb. 7, 2017

(54) OPTICAL CONNECTOR AND OPTICAL CONNECTOR FITTING STRUCTURE

(71) Applicant: YAZAKI CORPORATION, Minato-ku, Tokyo (JP)

(72) Inventors: Chiemi Yamagata, Susono (JP); Tomohiro Hikosaka, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/165,640

(22) Filed: May 26, 2016

(65) Prior Publication Data

US 2016/0266327 A1    Sep. 15, 2016

Related U.S. Application Data

(63) Continuation of application No. PCT/JP2015/050760, filed on Jan. 14, 2015.

(30) Foreign Application Priority Data

Jan. 17, 2014    (JP) ................................. 2014-006435

(51) Int. Cl.
*G02B 6/38* (2006.01)

(52) U.S. Cl.
CPC ........... *G02B 6/3825* (2013.01); *G02B 6/3869* (2013.01); *G02B 6/3878* (2013.01); *G02B 6/389* (2013.01); *G02B 6/3821* (2013.01); *G02B 6/3877* (2013.01)

(58) Field of Classification Search
CPC ... G02B 6/3821; G02B 6/3825; G02B 6/3869; G02B 6/387; G02B 6/3877; G02B 6/3878; G02B 6/389

See application file for complete search history.

(56) References Cited

U.S. PATENT DOCUMENTS

| | | | | |
|---|---|---|---|---|
| 5,764,834 A | * | 6/1998 | Hultermans | G02B 6/3893 385/139 |
| 6,783,283 B2 | * | 8/2004 | Nishita | G02B 6/3817 385/39 |
| 8,845,209 B2 | * | 9/2014 | Hikosaka | G02B 6/3878 385/62 |

(Continued)

FOREIGN PATENT DOCUMENTS

| | | |
|---|---|---|
| JP | 2002-182075 A | 6/2002 |
| JP | 2013-257366 A | 12/2013 |
| WO | 2012141163 A1 | 10/2012 |

OTHER PUBLICATIONS

International Search Report dated Apr. 7, 2015 issued by the International Searching Authority in counterpart International Application No. PCT/JP2015/050760 (PCT/ISA/210).

(Continued)

*Primary Examiner* — Daniel Petkovsek
(74) *Attorney, Agent, or Firm* — Sughrue Mion, PLLC (57) ABSTRACT

In an optical connector fitting structure, a first optical connector includes a first fixing member which fixes a first optical fiber to a first housing by being attached to the first housing while its locking state is changed from a temporarily locked state to an actually locked state, and a second optical connector includes a second fixing member which fixes a second optical fiber to the second housing by being attached to the second housing while its locking state is changed from a temporarily locked state to an actually locked state.

1 Claim, 11 Drawing Sheets

(56) References Cited

U.S. PATENT DOCUMENTS

| | | | |
|---|---|---|---|
| 9,033,591 B2* | 5/2015 | Hikosaka | G02B 6/38 385/76 |
| 9,188,747 B2* | 11/2015 | Gniadek | G02B 6/3825 |
| 2014/0016900 A1 | 1/2014 | Maesoba | |

OTHER PUBLICATIONS

Written Opinion dated Apr. 7, 2015 issued by the International Searching Authority in counterpart International Application No. PCT/JP2015/050760 (PCT/ISA/237).

International Preliminary Report on Patentability, issued from the International Bureau in counterpart International Application No. PCT/JP2015/050760, issued on Jul. 19, 2016.

* cited by examiner

OPTICAL CONNECTOR AND OPTICAL CONNECTOR FITTING STRUCTURE

CROSS REFERENCE TO RELATED APPLICATION(S)

This application is a continuation of PCT application No. PCT/JP2015/050760, which was filed on Jan. 14, 2015, based on Japanese Patent Application (No. 2014-006435) filed on Jan. 17, 2014, the contents of which are incorporated herein by reference.

BACKGROUND OF THE INVENTION

1. Field of the Invention

The present invention relates to an optical connector and an optical connector fitting structure.

2. Description of the Related Art

Conventionally, there have been cases where optical fibers are used instead of electric wires in order to reduce noise caused from electric wires used for communications between electric components of a car. These optical fibers are optically connected by an optical connector fitting structure.

In the optical connector fitting structure, two optical connectors holding optical fibers in housings are connector-fitted, whereby the optical fibers of the optical connectors are optically connected.

In some optical connectors, in order to facilitate the attachment and detachment of the optical fibers to and from the housing, a fixing member provided separately from the housing is attached to the housing to thereby fix the optical fibers to the housing, and the fixing member is detached from the housing to thereby detach the optical fibers from the housing (see JP-A-2002-182075).

In the optical connector fitting structure described in JP-A-2002-182075, the fixing member detects the fitting state and absorbs the fitting looseness.

SUMMARY OF THE INVENTION

However, the optical connector fitting structure described in JP-A-2002-182075 has a problem in that it is inferior in assembly workability because when the optical fibers are pulled and the fixing member moves while the fixing member is being attached to the housing, there is a possibility that the fixing member separates from the housing and falls and as a consequence, the fixing member is damaged.

The present invention is made in view of the above, and an object thereof is to provide an optical connector and an optical connector fitting structure that improve the workability of assembly, to the housing, of the fixing member that fixes the optical fiber to the housing.

The above-described object of the present invention is achieved by the following structures.

(1) An optical connector fitting structure in which a first optical connector which holds a first optical fiber in a first housing and a second optical connector which holds a second optical fiber in a second housing are connector-fitted, whereby the first optical fiber and the second optical fiber are optically connected, wherein the first optical connector includes: a first fixing member which is provided separately from the first housing and which is which fixes the first optical fiber to the first housing by being attached to the first housing while its locking state is changed from a temporarily locked state to an actually locked state, and wherein the second optical connector includes: a second fixing member which is provided separately from the second housing and which fixes the second optical fiber to the second housing by being attached to the second housing while its locking state is changed from a temporarily locked state to an actually locked state.

(2) The optical connector fitting structure according to the structure of the above (1), wherein the first fixing member includes: a temporary locking fitting preventing wall portion which prevents connector fitting by striking against the second housing in a middle of fitting when the first optical connector and the second optical connector are moved in a connector fitting direction while the first fixing member is in the temporarily locked state.

(3) The optical connector fitting structure according to the structure of the above (2), wherein in the temporary locking fitting preventing wall portion, an area of a part overlapping the second housing in a fitting completed state is adjusted such that a load applied when connector fitting is performed in a state where the first fixing member is not actually locked is in a range of not less than twice and not more than three times a load applied when connector fitting is performed in the actually locked state.

The above-described object of the present invention is achieved by the following structure.

(4) An optical connector in which an optical fiber is held in a housing, the optical connector including: a fixing member which is provided separately from the housing and which fixes the optical fiber to the housing by being attached to the housing while its locking state is changed from a temporarily locked state to an actually locked state.

In the optical connector fitting structure according to the structure of the above (1) of the present invention, when the first fixing member and the second fixing member are in the temporarily locked state, even if the first optical fibers and the second optical fibers are pulled, the first fixing member and the second fixing member never separate from the first housing and the second housing. Consequently, the workability of assembly, to the first and second housings, of the first and second fixing members that fix the first and second optical fibers to the first and second housings can be improved.

In the optical connector fitting structure according to the structure of the above (2) of the present invention, when the first optical connector and the second optical connector are moved in the fitting direction with the first fixing member being in the temporarily locked state, since the locking fitting preventing wall portion abuts against the second housing in the middle of fitting and prevents connector fitting, it is easily detected that the fitting state is unstable, so that optical connection can be reliably made in the normal connector fitting state.

In the optical connector fitting structure according to the structure of the above (3) of the present invention, when connector fitting is performed in the state where the first fixing member is not actually locked (state which is neither the temporarily locked state nor the actually locked state), since the load applied at the time of connector fitting is in a range of not less than twice and not more than three times the load applied at the time of fitting in the actually locked state, it is easily detected that the fitting state is unstable, so that optical connection can be reliably made in the normal connector fitting state.

In an optical connector according to the structure of the above (4) of the present invention, when the fixing member is in the temporarily locked state, even if the optical fiber is pulled, the fixing member never separates from the housing.

Consequently, the workability of assembly, to the housing, of the fixing member that fixes the optical fiber to the housing can be improved.

DETAILED DESCRIPTION OF THE EXEMPLARY EMBODIMENTS

Hereinafter, referring to the drawings, a preferred embodiment of an optical connector and an optical connector fitting structure according to the present invention will be described in detail.

As shown in FIG. 1 to FIG. 7, an optical connector fitting structure 100 according to an embodiment of the present invention optically connects first and second optical fibers 71 and 72 used for optical communications of a car.

In the embodiment of the present invention, for convenience of explanation, the arrow (F) shown in the drawings is defined as the anterior direction, the arrow (B), as the posterior direction, the arrow (U), as the upper direction, and the arrow (L), as the lower direction.

Figure 1:
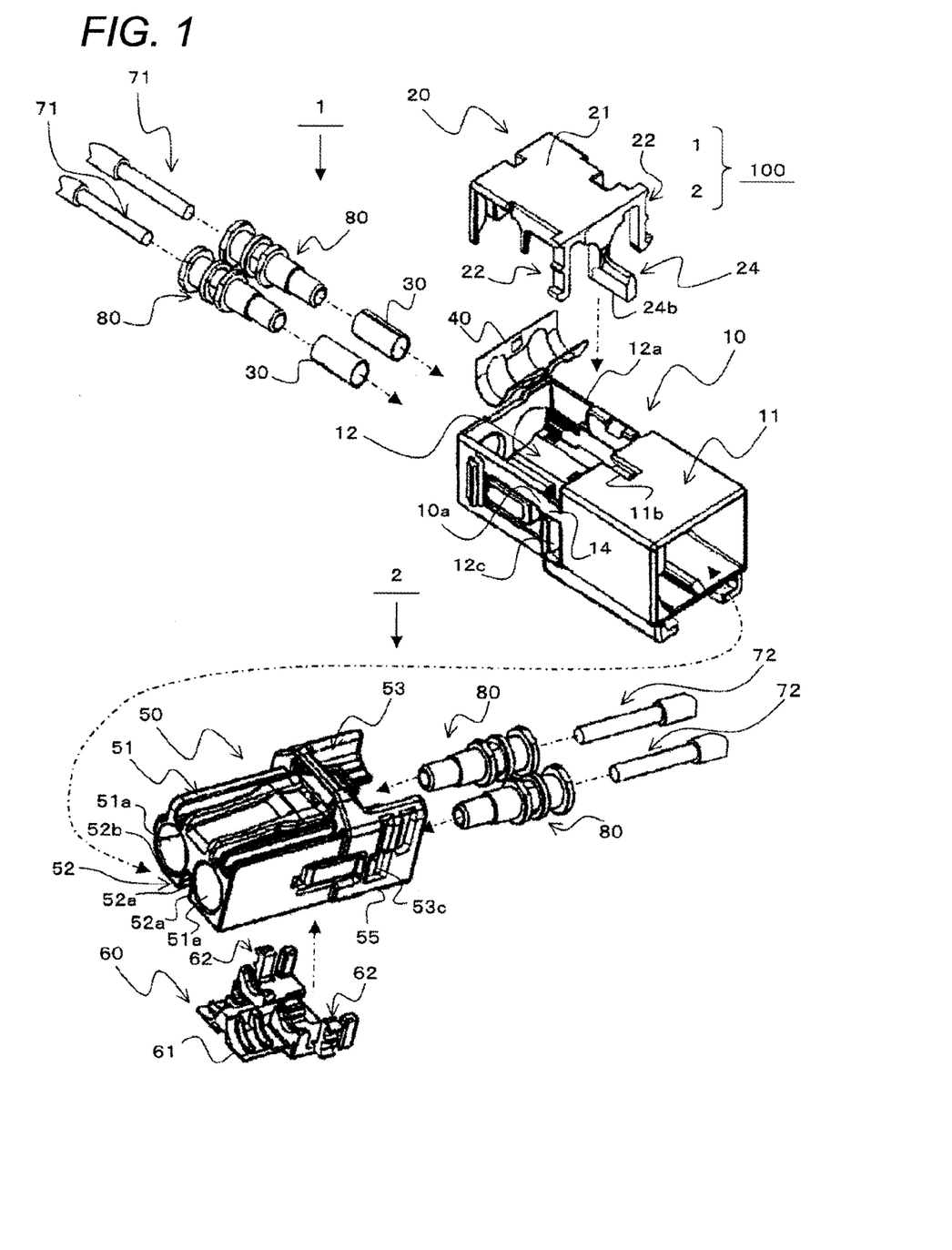
FIG. 1 is an exploded perspective view of an optical connector fitting structure according to an embodiment of the present invention.

In the optical connector fitting structure 100 according to the embodiment of the present invention, as shown in FIG. 1, two first and second optical connectors 1 and 2 holding first and second optical fibers 71 and 72 in first and second housings 10 and 50 are connector-fitted to thereby optically connect the first and second optical fibers 71 and 72 of the first and second optical connectors 1 and 2.

In the present embodiment, in the optical connector fitting structure 100, the first optical connector 1 holding a pair of first optical fibers 71 and 71 in the first housing 10 and the second optical connector 2 holding a pair of second optical fibers 72 and 72 in the second housing 50 are connector-fitted to thereby optically connect the corresponding first optical fibers 71 and second optical fibers 72.

First, the first optical connector 1 will be described.

The first optical connector 1 has the pair of first optical fibers 71 having ferrules 80 attached to the ends thereof, the first housing 10, a first fixing member 20, two divided sleeves 30 provided so as to correspond to the pair of optical fibers, and a spring member 40.

The first optical fibers 71 are formed of a light guiding material, and realized by a so-called multi-mode plastic optical fiber. These first optical fibers 71 are structured so as to be doubly covered with covering portions formed of an insulating synthetic resin and be exposed by removing the covering portions at the ends.

The ferrules 80 are cylindrical metal members holding the ends of the first optical fibers 71 with through holes.

Figure 2:
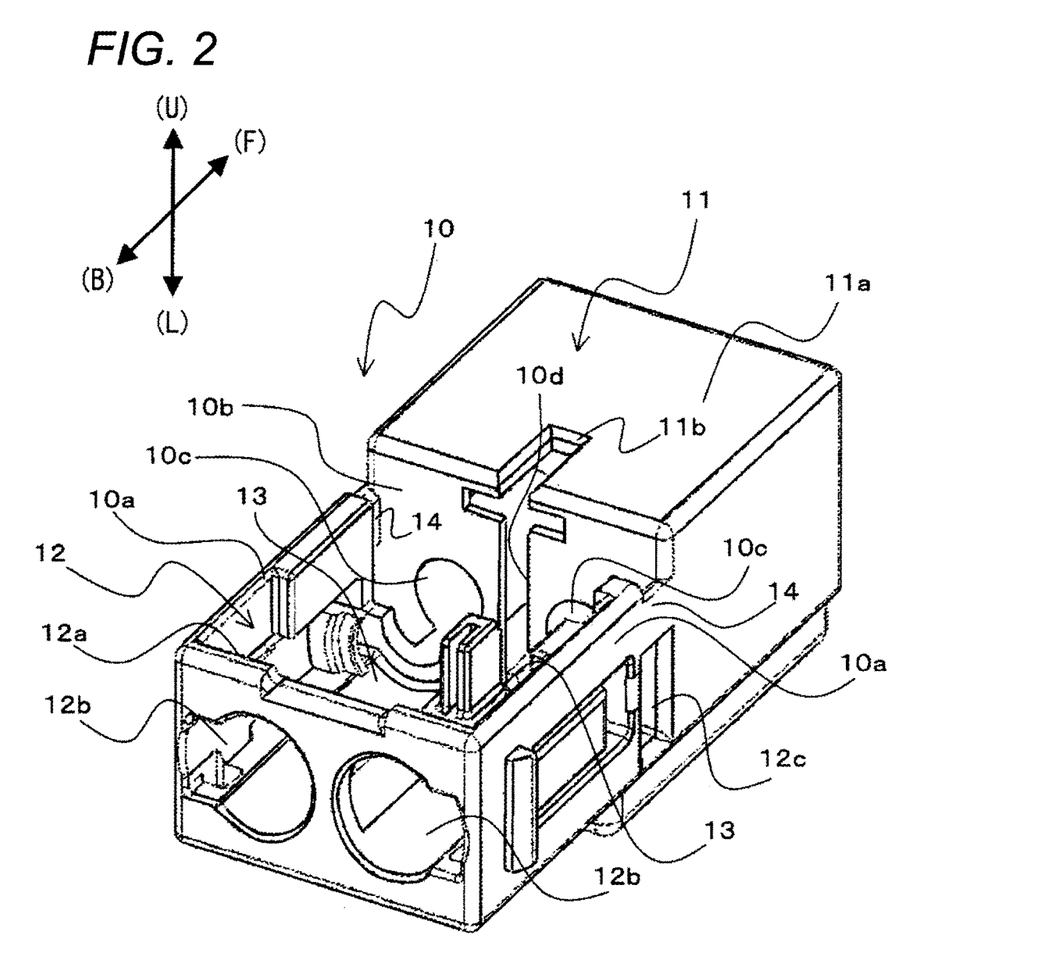
FIG. 2 is a perspective view of a first housing viewed diagonally from behind.
Figure 3:
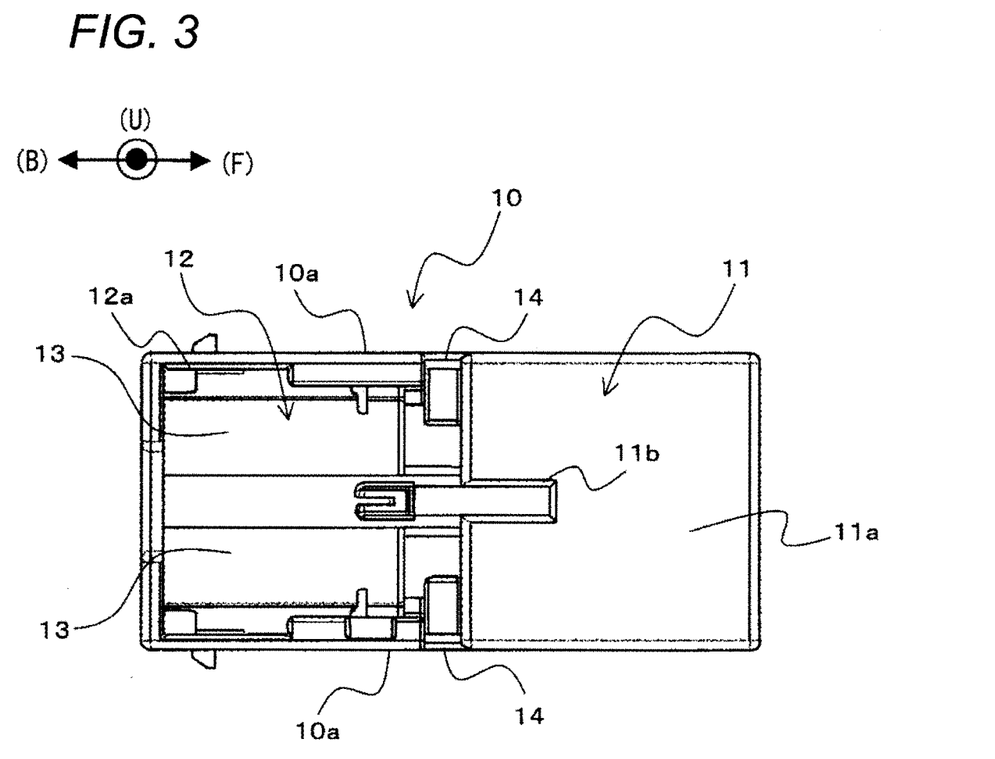
FIG. 3 is a top view of the first housing.

The first housing 10 has, as shown in FIG. 2, a first housing fitting portion 11 formed of an insulating material such as a synthetic resin and fitted to the second optical connector 2 and a ferrule accommodating portion 12 containing two ferrule holding and accommodating chambers 13 and 13 holding and accommodating the ferrules 80 of the first optical fibers 71.

The first housing fitting portion 11 has a box shape having a rectangular fitting opening corresponding the transverse cross-sectional shape of a later-described second housing fitting portion 51 of the second housing 50, and is structured so as to be fitted to the second housing fitting portion 51.

On this first housing fitting portion 11, an insertion slit 11b opened so that a later-described temporary locking fitting preventing wall portion 24 of the first fixing member 20 is insertable into the first housing fitting portion 11 is formed at the ferrule accommodating portion 12 side end portion of an upper wall 11a.

The ferrule accommodating portion 12 has a box shape where an opening 12a is formed on the upper surface which is the side where the first fixing member 20 is attached and two insertion openings 12b and 12b are formed so that the ferrules 80 can be inserted from behind.

Moreover, the first housing 10 has a pair of housing side locking portions 14 and 14 that temporarily and actually lock the first fixing member 20.

The housing side locking portions 14 are each a part formed in a width where part of one side wall 10a of the first housing 10 can be supported by being sandwiched between two adjoining locking protrusions 23 of later described three locking protrusions 23 of the first fixing member 20.

More specifically, the housing side locking portions 14 are each formed of a wall that is made a surface where an upper side inner edge surface of an opening 12c and the upper end surface of the side wall 10a are supported by being sandwiched between the two locking protrusions 23 by the opening 12c being formed at a predetermined distance from the upper end surface of the side wall 10a.

Moreover, the opening 12c has its width in the front-back direction adjusted so that the locking protrusions 23 are accommodated inside and has its width in the vertical direction adjusted so that the part from the locking protrusion 23 at the top end portion in the vertical direction to the locking protrusion 23 at the base end portion is accommodated inside.

Moreover, a partition 10b as the partition between the first housing fitting portion 11 and the ferrule accommodating portion 12 is provided with two insertion holes 10c and 10c formed so that the ends of the ferrules 80 accommodated in the ferrule holding and accommodating chambers 13 can protrude toward the first housing fitting portion 11 and a guide slit 10*d* continuous with the insertion slit 11*b* and guiding the temporary locking fitting preventing wall portion 24 downward.

Figure 4:
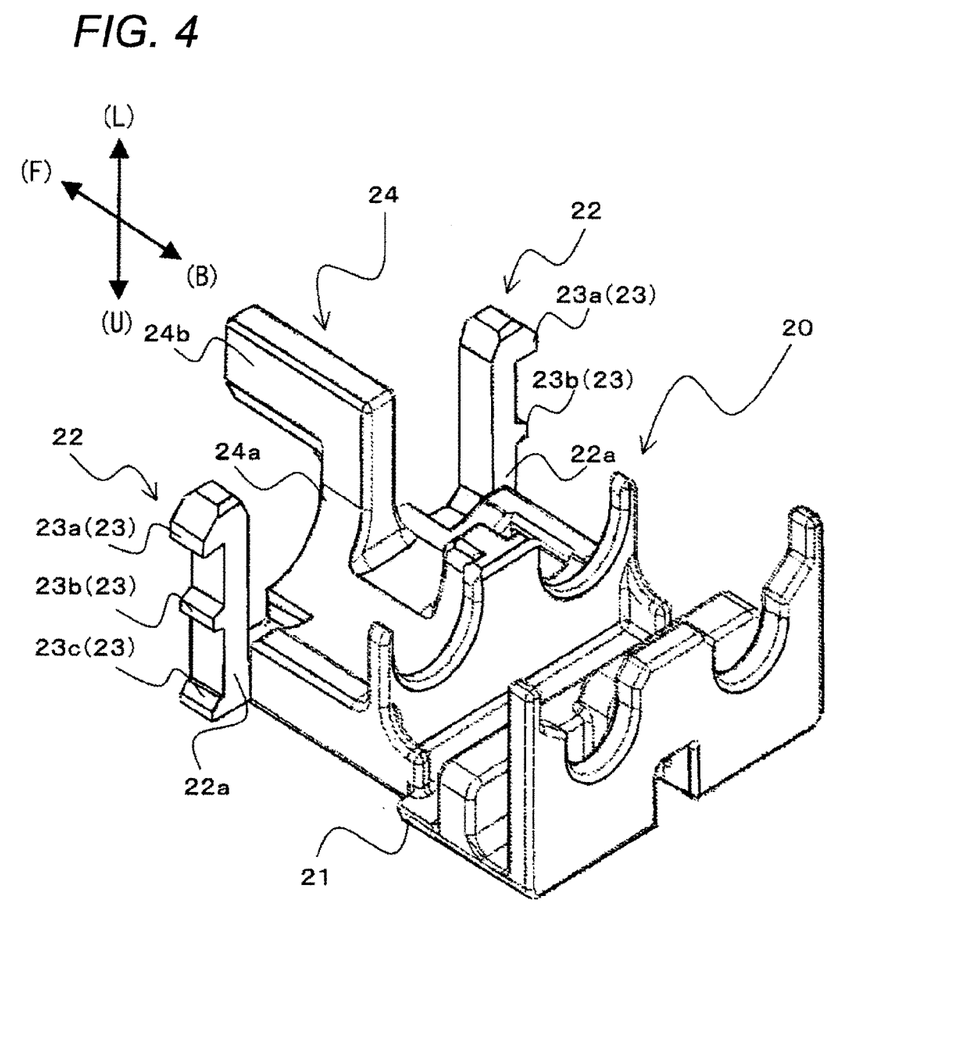
FIG. 4 is a perspective view of a first fixing member viewed diagonally from behind.

The first fixing member 20 is a fixing member that is provided separately from the first housing 10 and fixes the first optical fibers 71 to the first housing 10 by being attached to the first housing 10 while its locking state is changed from temporarily locked state to actually locked state.

This first fixing member 20 is, as shown in FIG. 4, formed of an insulating material such as a synthetic resin and has a ceiling wall 21 constituting the main body portion, a pair of fixing member side locking portions 22 and 22 and the temporary locking fitting preventing wall portion 24.

The ceiling wall 21 has a rectangular outside shape corresponding to the shape of the opening 12*a* of the ferrule accommodating portion 12 so as to cover the opening 12*a*.

The pair of fixing member side locking portions 22 and 22 are parts locked to the pair of housing side locking portions 14 and 14 of the first housing 10, and the fixing member side locking portions 22 protrude in the form of an elastic piece downward from the side end portions of the ceiling wall 21.

The fixing member side locking portions 22 each have an elastic protruding piece portion 22*a* protruding in the form of an elastic piece downward from the side end portion of the ceiling wall 21 and the three locking protrusions 23 provided so as to protrude outward at the base end portion, at the top end portion and between the base end portion and the top end portion in the direction of protrusion of the elastic protruding piece portion 22*a*.

Hereinafter, when the three locking protrusions 23 are described being distinguished from one another, the locking protrusion 23 at the top end portion will be referred to as a top end locking protrusion 23*a*, the locking protrusion 23 in the middle, as an intermediate locking protrusion 23*b*, and the locking protrusion 23 at the base end portion, as a base end locking protrusion 23*c*.

The three locking protrusions 23 are adjusted so that the distances between the adjoining locking protrusions 23 are the vertical width of the housing side locking portions 14.

For this reason, the first fixing member 20 is temporarily locked to the first housing 10 so that the housing side locking portions 14 are supported by being sandwiched between the top end locking protrusions 23*a* and the intermediate locking protrusions 23*b*.

Moreover, the first fixing member 20 is actually fixed to the first housing 10 so that the housing side locking portions 14 are supported by being sandwiched between the intermediate locking protrusions 23*b* and the base end locking protrusions 23*c*.

That is, the first fixing member 20 is structured so as to be locked to the first housing 10 by a change from the temporarily locked state using the top end locking protrusions 23*a* and the intermediate locking protrusions 23*b* to the actually locked state using the intermediate locking protrusions 23*b* and the base end locking protrusions 23*c*.

The temporary locking fitting preventing wall portion 24 has a base portion 24*a* protruding downward from the end portion on the first housing fitting portion 11 side of the ceiling wall 21 and a fitting direction protruding wall portion 24*b* provided so as to protrude toward the first housing fitting portion 11 at the lower end portion of the base portion 24*a*.

This fitting direction protruding wall portion 24*b* is situated so as to protrude toward the first housing fitting portion 11 in the state where the first fixing member 20 is temporarily and actually locked to the first housing 10.

For this reason, when the first fixing member 20 is actually locked to the first housing 10, the temporary locking fitting preventing wall portion 24 is inserted into the insertion slit 11*b* and moved into the first housing fitting portion 11 by way of the guide slit 10*d*.

The divided sleeves 30 are members that align the first optical fibers 71 and the second optical fibers 72 by the insertion, into the tubes, of the ends of the ferrules 80 attached to the first optical fibers 71 and the second optical fibers 72.

These divided sleeves 30 are each a cylindrical elastic member, and are structured so as to enlarge in accordance with the diameter of the ferrule 80 by the formation of a slit extending from one end to the other end in one place in the circumferential direction.

The spring member 40 is attached to the first housing 10 together with the first fixing member 20 in the condition of being attached to the first fixing member 20, thereby pushing toward the second optical connector 2 the ferrules 80 accommodated in the ferrule accommodating portion 12.

By such a spring member 40, in the state where the first optical connector 1 and the second optical connector 2 are connector-fitted, the ferrules 80 of the first optical fibers 71 face the corresponding ferrules 80 of the second optical fibers 72 while maintaining a predetermined distance necessary for optical connection.

Now, with reference to FIGS. 8A and 8B, the procedure by which the first fixing member 20 is attached to the first housing 10 and operations of portions will be described.

First, the worker places the ferrules 80 attached to the pair of first optical fibers 71 and 71 into the ferrule accommodating portion 12.

Figure 8A:
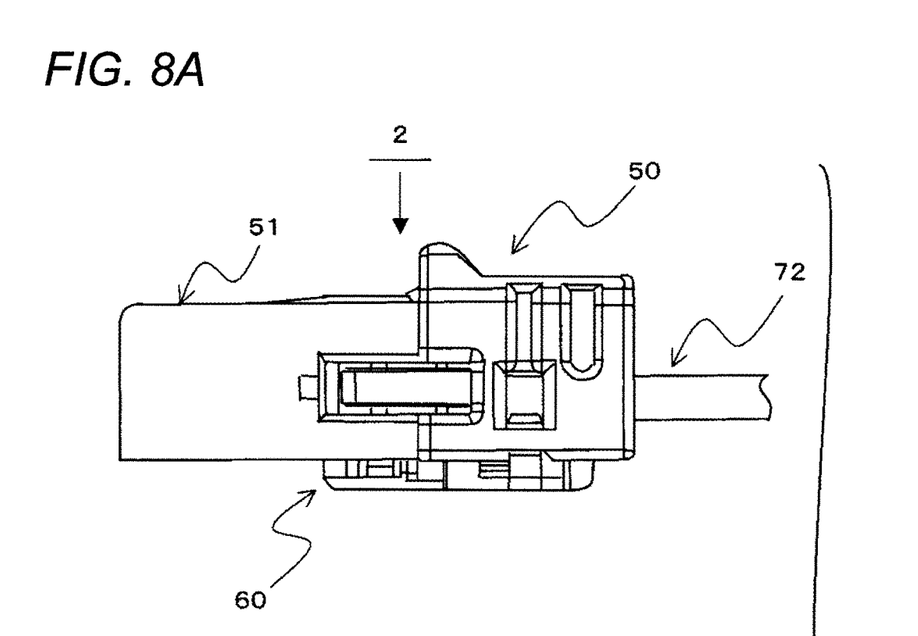
FIG. 8A is a cross-sectional view of a first optical connector in the state where the first fixing member is temporarily locked.

Then, the worker temporarily locks, to the first housing 10, the first fixing member 20 to which the spring member 40 is attached (see FIG. 8A). In this temporarily locked state, even if the first optical fibers 71 are pulled, the first fixing member 20 never separates from the first housing 10. For this reason, the work of assembling the first optical connector 1 is facilitated.

Moreover, by the first fixing member 20 separating from the first housing 10 and falling, the first fixing member 20 can be prevented from being damaged.

In this temporarily locked state, the fitting direction protruding wall portion 24*b* of the temporary locking fitting preventing wall portion 24 is situated so as to abut against the second housing 50 fitted in the first housing fitting portion 11.

Figure 8B:
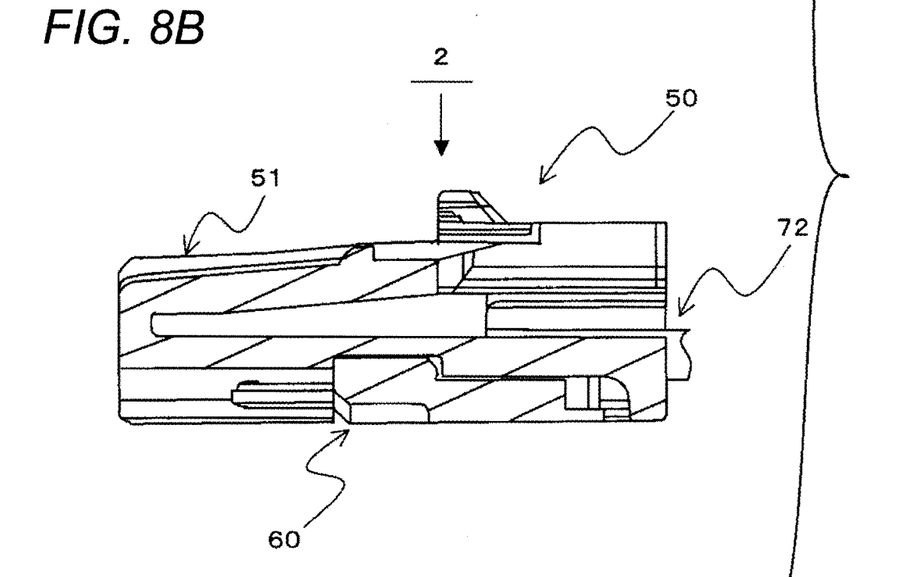
FIG. 8B is a cross-sectional view of the first optical connector in the state where the first fixing member is actually locked.

Then, the worker actually locks the first fixing member 20 to the first housing 10 (see FIG. 8B). With this, the attachment of the first fixing member 20 to the first housing 10 is completed.

Next, the second optical connector 2 will be described.

The second optical connector 2 has the pair of second optical fibers 72 having the ferrules 80 attached to the ends thereof, the second housing 50 and a second fixing member 60.

The second optical fibers 72 are formed of a light guiding material similarly to the first optical fibers 71, and realized by a so-called multi-mode plastic optical fiber.

Figure 5:
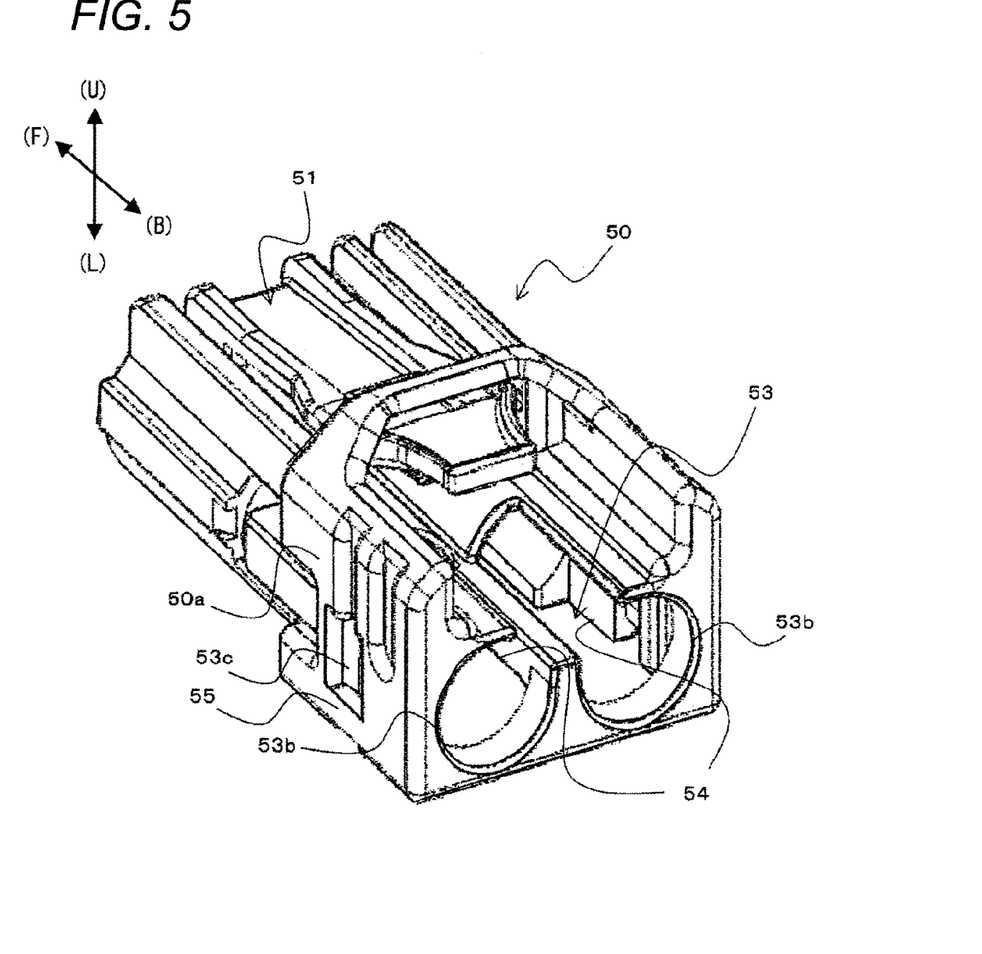
FIG. 5 is a perspective view of a second housing viewed diagonally from behind.

The second housing 50 has the second housing fitting portion 51 formed of an insulating material such as a synthetic resin and fitted to the first optical connector 1 and a ferrule accommodating portion 53 containing two ferrule holding and accommodating chambers 54 and 54 holding and accommodating the ferrules 80 of the second optical fibers 72.

The second housing fitting portion 51 has a substantially rectangular parallelepiped shape and on the front surface, two sleeve insertion holes 51a and 51a are formed in which the divided sleeves 30 having the ferrules 80 of the first optical fibers 71 attached thereto can be inserted.

The sleeve insertion holes 51a communicate with the ferrule holding and accommodating chambers 54.

Figure 6:
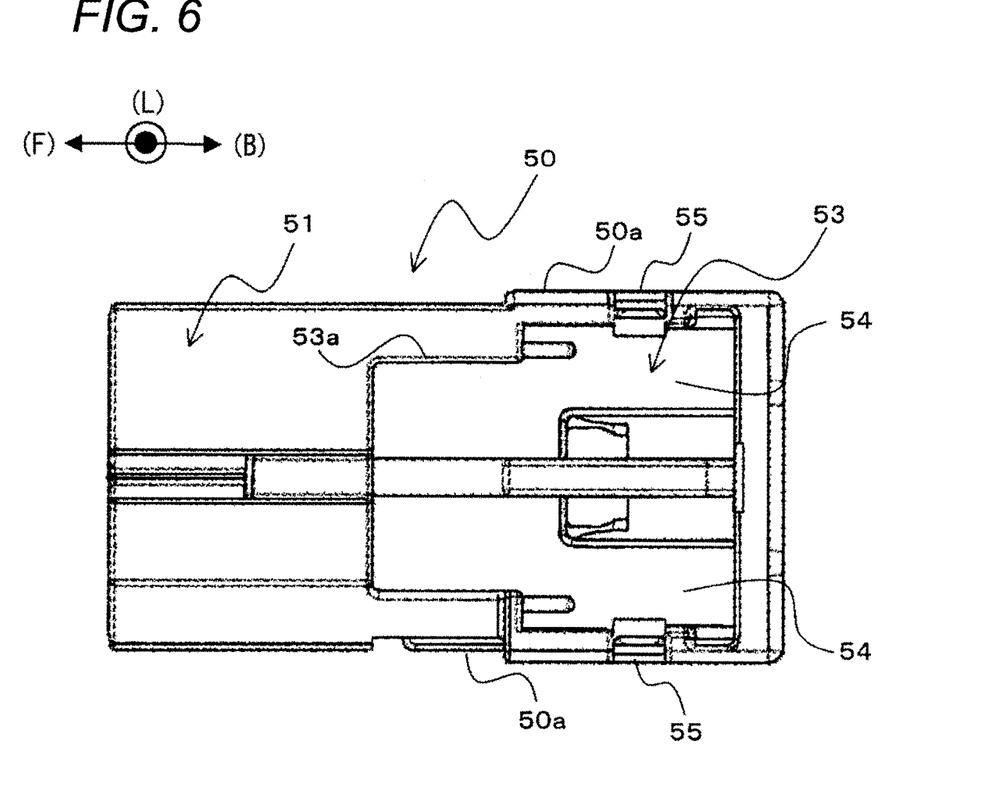
FIG. 6 is a bottom view of the second housing.

Moreover, on the second housing fitting portion 51, a guide groove 52 that guides the insertion of the fitting direction protruding wall portion 24b is formed so that when the first optical connector 1 and the second optical connector 2 are fitted together, the movement in the fitting direction is not prevented by abutment against the fitting direction protruding wall portion 24b of the actually locked first fixing member 20.

The guide groove 52 is a groove extending rearward from the front end surface in a lower part of the second housing fitting portion 51 so as to correspond to the position of the fitting direction protruding wall portion 24b of the first fixing member 20 actually locked to the first housing 10.

This guide groove 52 has a pair of intra-groove side surfaces 52a and 52a facing both side surfaces of the fitting direction protruding wall portion 24b and a groove bottom surface 52b facing the lower surface of the fitting direction protruding wall portion 24b.

For this reason, by making adjustment so that the area of the part where the pair of intra-groove side surfaces 52a and 52a and the groove bottom surface 52b overlap (part where they are in sliding contact with) the fitting direction protruding wall portion 24b is large, the load when the first optical connector 1 and the second optical connector 2 are forcibly fitted together can be increased in the state where the first fixing member 20 is neither in the temporarily locked state nor the actually locked state (state where the first fixing member 20 is situated between the temporarily locked state and the actually locked state and the fitting direction protruding wall portion 24b does not abut against the second housing 50 but enters the guide groove 52), so that it is easily detected that the first fixing member 20 is not in the actually locked state.

For example, in the temporary locking fitting preventing wall portion 24, the area of the part overlapping the second housing 50 in the fitting completed state is adjusted so that the load applied when the first optical connector 1 and the second optical connector 2 are connector-fitted in the state where the first fixing member 20 is not actually locked (state which is neither the temporarily locked state nor the actually locked state) is in a range of not less than twice and not more than three times the load applied when they are connector-fitted in the actually locked state.

The ferrule accommodating portion 53 has a box shape where an opening 53a is formed on the lower surface which is the side where the second fixing member 60 is attached and two insertion openings 53b and 53b are formed so that the ferrules 80 can be inserted from behind.

Moreover, the second housing 50 has a pair of housing side locking portions 55 and 55 by which the second fixing member 60 is locked in the temporarily locked state and in the actually locked state.

The housing side locking portions 55 are each a part formed in a width where part of one side wall 50a of the second housing 50 can be supported by being sandwiched between two adjoining locking protrusions 63 of later described three locking protrusions 63 of the second fixing member 60.

More specifically, the housing side locking portions 55 are each formed of a wall that is made a surface where a lower side inner edge surface of an opening 53c and the lower end surface of the side wall 50a are supported by being sandwiched between the two locking protrusions 63 by the opening 53c being formed at a predetermined distance from the lower end surface of the side wall 50a.

Moreover, the opening 53c has its width in the front-back direction adjusted so that the locking protrusions 23 are accommodated inside and has its width in the vertical direction adjusted so that the part from the locking protrusion 63 at the top end portion in the vertical direction to the locking protrusion 63 at the base end portion is accommodated inside.

Figure 7:
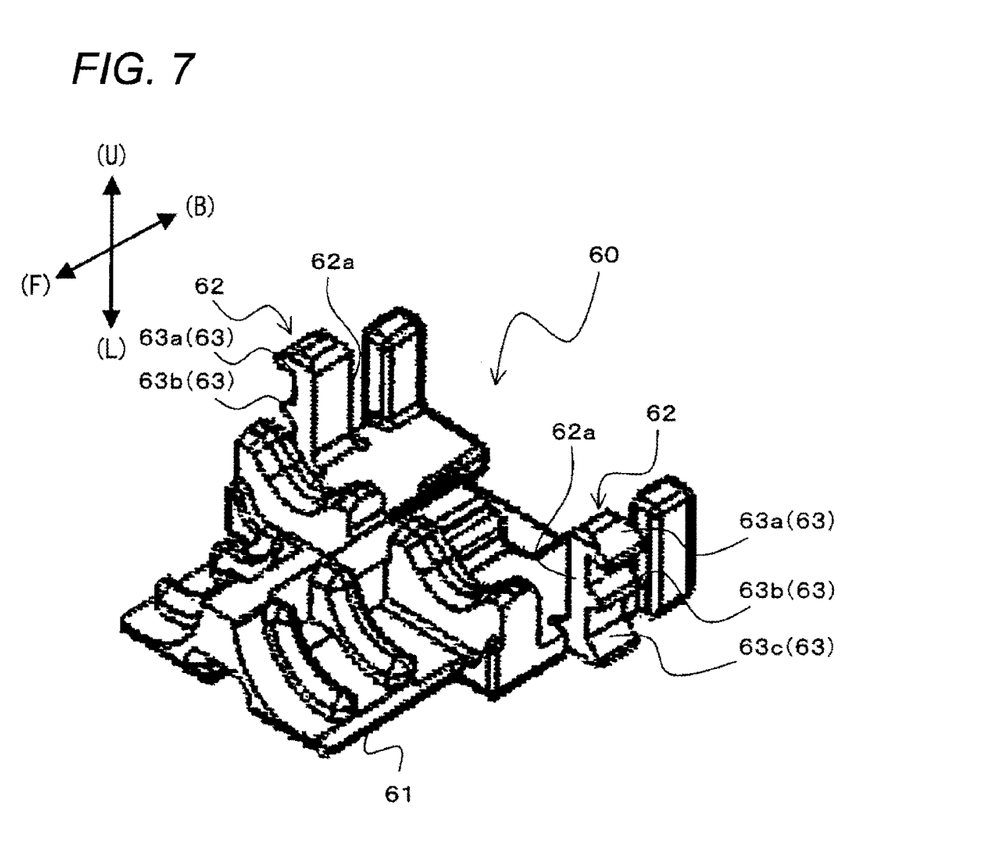
FIG. 7 is a perspective view of a second fixing member viewed diagonally from the front.

The second fixing member 60 is a fixing member that is provided separately from the second housing 50 and fixes the second optical fibers 72 to the second housing 50 by being attached to the second housing 50 while its locking state is changed from the temporarily locked state to the actually locked state.

This second fixing member 60 is, as shown in FIG. 7, formed of an insulating material such as a synthetic resin and has a bottom wall 61 constituting the main body portion and a pair of fixing member side locking portions 62 and 62.

The bottom wall 61 has a rectangular outside shape corresponding to the shape of the opening 53a of the ferrule accommodating portion 53 so as to cover the opening 53a.

The pair of fixing member side locking portions 62 and 62 are parts locked to the pair of housing side locking portions 55 and 55 of the second housing 50, and the fixing member side locking portions 62 protrude in the form of an elastic piece upward from the side end portions of the bottom wall 61.

The fixing member side locking portions 62 each have an elastic protruding piece portion 62a protruding in the form of an elastic piece upward from the side end portion of the bottom wall 61 and the three locking protrusions 63 provided so as to protrude outward at the base end portion, at the top end portion and between the base end portion and the top end portion in the direction of protrusion of the elastic protruding piece portion 62a.

Hereinafter, when the three locking protrusions 63 are described being distinguished from one another, the locking protrusion 63 at the top end portion will be referred to as a top end locking protrusion 63a, the locking protrusion 63 in the middle, as an intermediate locking protrusion 63b, and the locking protrusion 63 at the base end portion, as a base end locking protrusion 63c.

The three locking protrusions 63 are adjusted so that the distances between the adjoining locking protrusions 63 are the vertical width of the housing side locking portions 55.

For this reason, the second fixing member 60 is temporarily locked to the second housing 50 so that the housing side locking portions 55 are supported by being sandwiched between the top end locking protrusions 63a and the intermediate locking protrusions 63b.

Moreover, the second fixing member 60 is actually fixed to the second housing 50 so that the housing side locking portions 55 are supported by being sandwiched between the intermediate locking protrusion 63b and the base end locking protrusion 63c.

That is, the second fixing member 60 is structured so as to be locked to the second housing 50 by a change from the temporarily locked state using the top end locking protrusions 63a and the intermediate locking protrusions 63b to the actually locked state using the intermediate locking protrusions 63b and the base end locking protrusions 63c.

Now, with reference to FIGS. 9A and 9B, the procedure by which the second fixing member 60 is attached to the second housing 50 and operations of portions will be described.

First, the worker places the ferrules 80 attached to the pair of second optical fibers 72 and 72 into the ferrule accommodating portion 53.

Figure 9A:
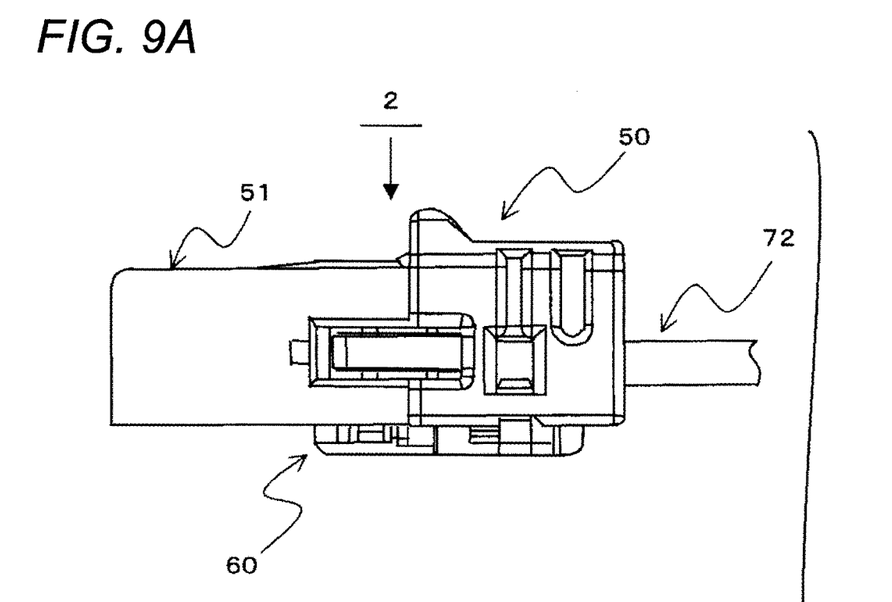
FIG. 9A is a side view of a second optical connector in the state where the second fixing member is temporarily locked.

Then, the worker temporarily locks the second fixing member 60 to the second housing 50 (see FIG. 9A). In this temporarily locked state, even if the second optical fibers 72 are pulled, the second fixing member 60 never separates from the second housing 50. For this reason, the work of assembling the second optical connector 2 is facilitated.

Moreover, by the second fixing member 60 separating from the second housing 50 and falling, the second fixing member 60 can be prevented from being damaged.

Figure 9B:
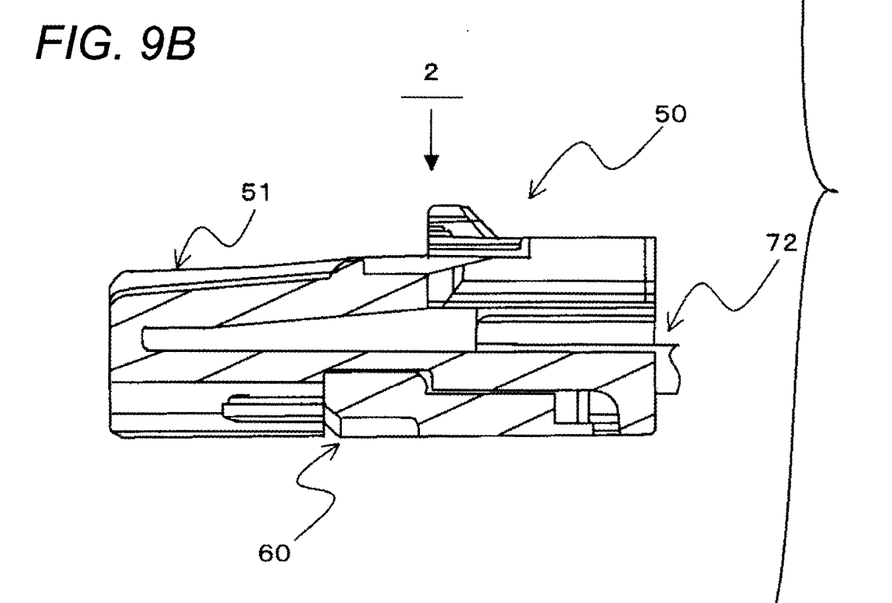
FIG. 9B is a cross-sectional view of the second optical connector under the state where the second fixing member is actually locked.

Then, the worker actually locks the second fixing member 60 to the second housing 50 (see FIG. 9B). With this, the attachment of the second fixing member 60 to the second housing 50 is completed.

Next, using FIG. 10 to FIG. 12, the procedure by which the worker fits the first optical connector 1 and the second optical connector 2 together and operations of portions will be described.

Figure 10:
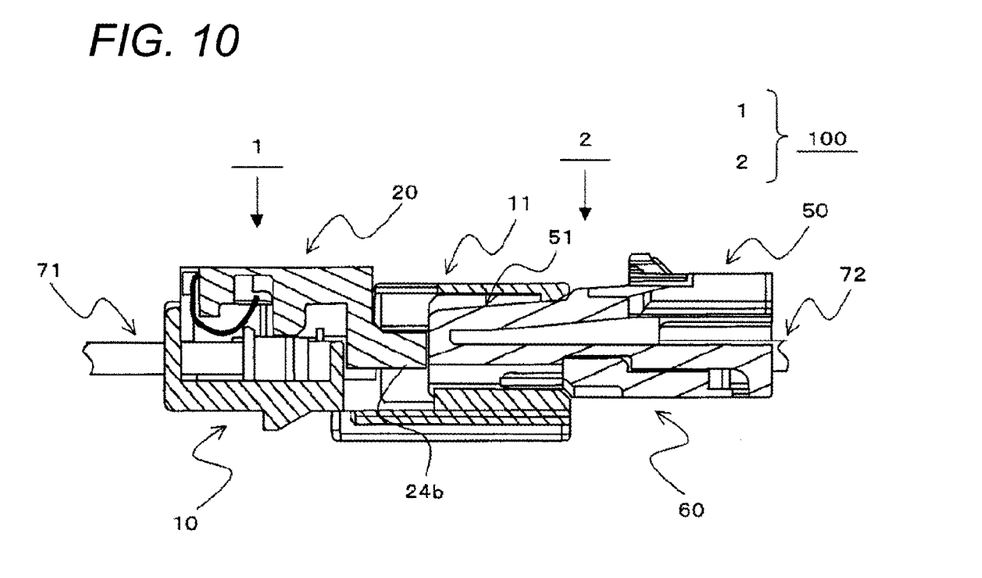
FIG. 10 is a cross-sectional view of the optical connector fitting structure when fitting is started with the first fixing member being in the temporarily locked state.

FIG. 10 is a cross-sectional view of the optical connector fitting structure 100 when fitting is started with the first fixing member 20 being in the temporarily locked state. FIG. 11 is a perspective cross-sectional view of the optical connector fitting structure 100 when fitting is started with the first fixing member 20 being in the temporarily locked state. FIG. 12 is a cross-sectional view of the optical connector fitting structure 100 in the state where the first optical connector 1 and the second optical connector 2 are fitted together.

Figure 11:
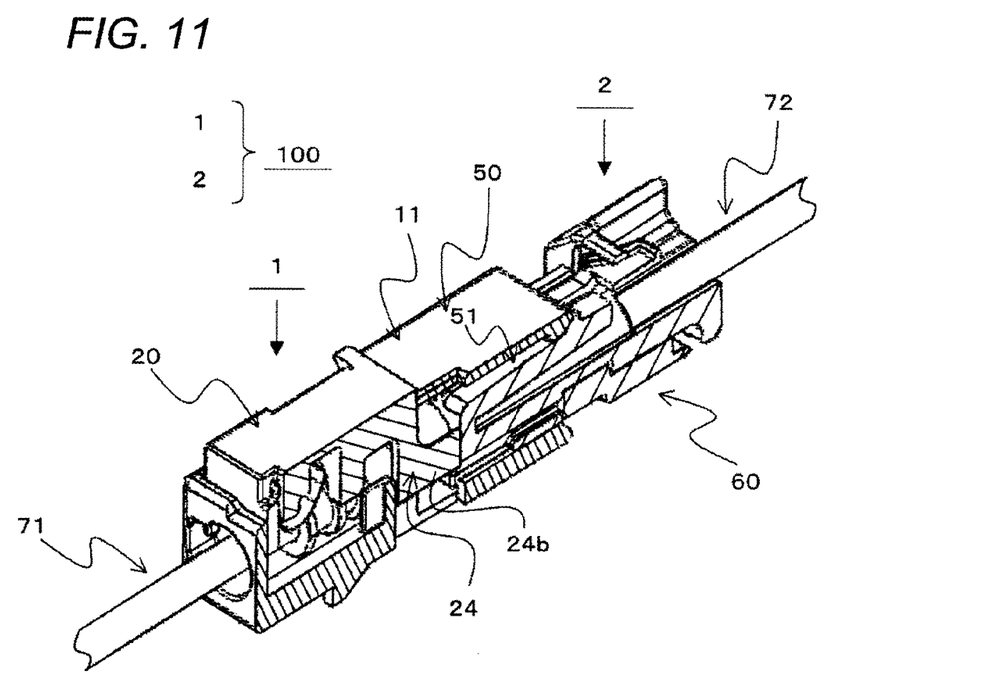
FIG. 11 is a perspective cross-sectional view of the optical connector fitting structure when fitting is started with the first fixing member being in the temporarily locked state.

When the second housing fitting portion 51 is inserted into the first housing fitting portion 11 with the first fixing member 20 of the first optical connector 1 being in the temporarily locked state, the second housing fitting portion 51 abuts against the fitting direction protruding wall portion 24b before reaching the fitting completion position in the first housing fitting portion 11, so that the movement of the second optical connector 2 is prevented (see FIG. 10 and FIG. 11).

For this reason, the first optical connector 1 and the second optical connector 2 cannot be fitted together, so that the worker can notice that the first fixing member 20 is in the temporarily locked state.

In consequence, the worker brings the first fixing member 20 into the state of being actually locked to the first housing 10, and then, inserts the second housing fitting portion 51 into the first housing fitting portion 11 again.

Figure 12:
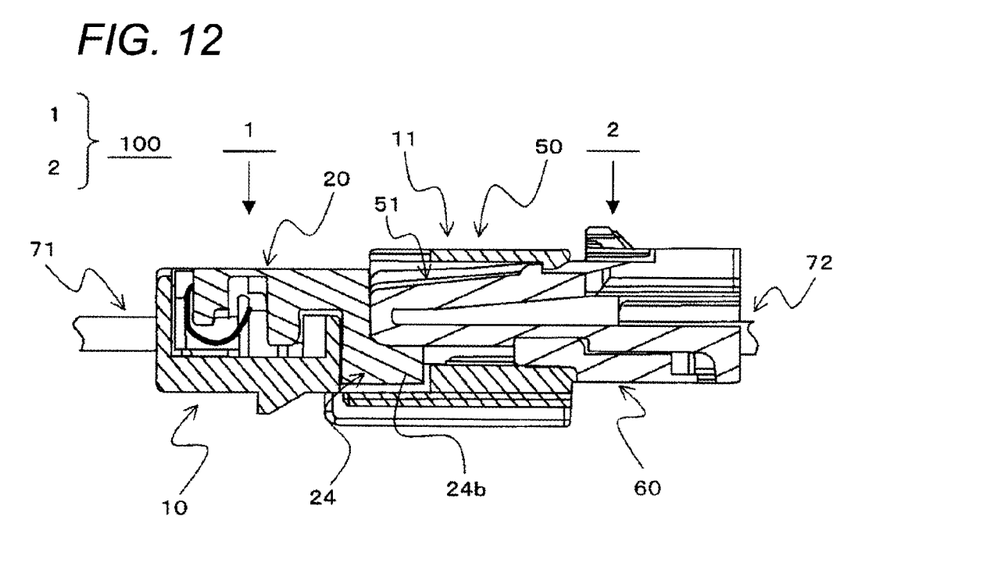
FIG. 12 is a cross-sectional view of the optical connector fitting structure under in the state where the first optical connector and the second optical connector are fitted together.

When the second housing fitting portion 51 is inserted into the first housing fitting portion 11 with the first fixing member 20 of the first optical connector 1 being in the actually locked state, since the fitting direction protruding wall portion 24b is directed into the guide groove 52 of the second housing fitting portion 51, the first optical connector 1 and the second optical connector 2 are fitted together without the fitting direction protruding wall portion 24b preventing the movement of the second optical connector 2 (see FIG. 12).

While a procedure where the worker manually fits the first optical connector 1 and the second optical connector 2 together is shown in this description of the procedure, the present invention is not limited thereto; the first optical connector 1 and the second optical connector 2 may be fitted together by using an automatic machine or the like. In this case, the automatic machine detects that the first fixing member 20 is in the temporarily locked state when the load applied at the time of fitting is not less than a predetermined value, and provides notification of the abnormality.

In the optical connector fitting structure 100 according to the embodiment of the present invention, when the first fixing member 20 and the second fixing member 60 are in the temporarily locked state, even if the first optical fibers 71 and the second optical fibers 72 are pulled, the first fixing member 20 and the second fixing member 60 never separate from the first housing 10 and the second housing 50. Consequently, the workability of assembly, to the first and second housings 10 and 50, of the first and second fixing members 20 and 60 that fix the first and second optical fibers 71 and 72 to the first and second housings 10 and 50 can be improved.

Moreover, in the optical connector fitting structure 100 according to the embodiment of the present invention, when the first optical connector 1 and the second optical connector 2 are moved in the connector fitting direction with the first fixing member 20 being in the temporarily locked state, since the temporary locking fitting preventing wall portion 24 abuts against the second housing 50 in the middle of fitting and prevents connector fitting, it is easily detected that the fitting state is unstable, so that optical connection can be reliably made in the normal connector fitting state.

Moreover, in the optical connector fitting structure 100 according to the embodiment of the present invention, when connector fitting is performed in the state where the first fixing member 20 is not actually locked (state which is neither the temporarily locked state nor the actually locked state), since the load applied at the time of fitting is in a range of not less than twice and not more than three times the load applied at the time of fitting in the actually locked state, it is easily detected that the fitting state is unstable, so that optical connection can be reliably made in the normal connector fitting state.

Moreover, in the first and second optical connectors 1 and 2 according to the embodiment of the present invention, when the first and second fixing members 20 and 60 are in the temporarily locked state, even if the first and second optical fibers 71 and 72 are pulled, the first and second fixing members 20 and 60 never separate from the first and second housings 10 and 50. Consequently, the workability of assembly, to the first and second housings 10 and 50, of the first and second fixing members 20 and 60 that fix the first and second optical fibers 71 and 72 to the first and second housings 10 and 50 can be improved.

While for the first and second optical connectors 1 and 2 and the optical connector fitting structure 100 according to the embodiment of the present invention, a structure where the pair of first optical fibers 71 and 71 and the pair of second optical fibers 72 and 72 are connected are shown as an example, the structure may be such that at least one first optical fiber 71 and one second optical fiber 72 are connected.

Now, features of the embodiment of the optical connector and the optical connector fitting structure according to the above-described present invention are briefly summarized and listed in the following:

[1] An optical connector fitting structure (100) in which a first optical connector (1) which holds a first optical fiber (71) in a first housing (10) and a second optical connector (2) which holds a second optical fiber (72) in a second housing (50) are connector-fitted, whereby the first optical fiber (71) and the second optical fiber (72) are optically connected, wherein the first optical connector (1) includes:

a first fixing member (20) which is provided separately from the first housing (10) and which fixes the first optical fiber (71) to the first housing (10) by being attached to the first housing (10) while its locking state is changed from a temporarily locked state to an actually locked state, and wherein the second optical connector (2) includes:

a second fixing member (60) which is provided separately from the second housing (50) and which fixes the second optical fiber (72) to the second housing (50) by being attached to the second housing (50) while its locking state is changed from a temporarily locked state to an actually locked state.

[2] The optical connector fitting structure (100) according to the above [1], wherein the first fixing member (20) includes:

a temporary locking fitting preventing wall portion (24) which prevents connector fitting by striking against the second housing (50) in a middle of fitting when the first optical connector (1) and the second optical connector (2) are moved in a connector fitting direction while the first fixing member (20) is in the temporarily locked state.

[3] The optical connector fitting structure (100) according to the above [2], wherein in the temporary locking fitting preventing wall portion (24), an area of a part overlapping the second housing (50) in a fitting completed state is adjusted such that a load applied when connector fitting is performed in a state where the first fixing member (20) is not actually locked is in a range of not less than twice and not more than three times a load applied when connector fitting is performed in the actually locked state.

[4] An optical connector (the first optical connector 1, the second optical connector 2) in which an optical fiber (the first optical fiber 71, the second optical fiber 72) is held in a housing (the first housing 10, the second housing 50), the optical connector (the first optical connector 1, the second optical connector 2) including:

a fixing member (the first fixing member 20, the second fixing member 60) which is provided separately from the housing (the first housing 10, the second housing 50) and which fixes the optical fiber (the first optical fiber 71, the second optical fiber 72) to the housing (the first housing 10, the second housing 50) by being attached to the housing (the first housing 10, the second housing 50) while its locking state is changed from a temporarily locked state to an actually locked state.

While the invention made by the present inventor has been concretely described above based on the above-described embodiment of the invention, the present invention is not limited to the above-described embodiment of the invention and various modifications are possible without departing from the gist thereof.

The optical connector and the optical connector fitting structure of the present invention are useful in improving the workability of assembly, to the housing, of the fixing member that fixes the optical fiber to the housing.

What is claimed is:

1. An optical connector fitting structure in which a first optical connector which holds a first optical fiber in a first housing and a second optical connector which holds a second optical fiber in a second housing are connector-fitted, whereby the first optical fiber and the second optical fiber are optically connected, wherein the first optical connector comprises:

a first fixing member which is provided separately from the first housing and which fixes the first optical fiber to the first housing by being attached to the first housing while its locking state is changed from a temporarily locked state to an actually locked state, wherein the second optical connector comprises:

a second fixing member which is provided separately from the second housing and which fixes the second optical fiber to the second housing by being attached to the second housing while its locking state is changed from a temporarily locked state to an actually locked state, wherein the first fixing member further comprises:

a temporary locking fitting preventing wall portion which prevents connector fitting by striking against the second housing in a middle of fitting when the first optical connector and the second optical connector are moved in a connector fitting direction while the first fixing member is in the temporarily locked state, and wherein in the temporary locking fitting preventing wall portion, an area of a part overlapping the second housing in a fitting completed state is adjusted such that a load applied when connector fitting is performed in a state where the first fixing member is not actually locked is in a range of not less than twice and not more than three times a load applied when connector fitting is performed in the actually locked state.

* * * * *